United States Patent [19]
Nemes

[11] Patent Number: 5,893,120
[45] Date of Patent: Apr. 6, 1999

[54] METHODS AND APPARATUS FOR INFORMATION STORAGE AND RETRIEVAL USING A HASHING TECHNIQUE WITH EXTERNAL CHAINING AND ON-THE-FLY REMOVAL OF EXPIRED DATA

[76] Inventor: Richard Michael Nemes, 1432 E. 35th St., Brooklyn, N.Y. 11234-2604

[21] Appl. No.: 775,864

[22] Filed: Jan. 2, 1997

[51] Int. Cl.$^6$ .................................................... G06F 17/30
[52] U.S. Cl. ............................ 707/206; 707/1; 707/100; 707/101; 707/202
[58] Field of Search ............................... 707/1, 200–206, 707/2, 100–103

[56] References Cited

U.S. PATENT DOCUMENTS

| 5,121,495 | 6/1992 | Nemes | 707/3 |
| 5,202,981 | 4/1993 | Shackelford | 707/1 |
| 5,287,499 | 2/1994 | Nemes | 707/206 |

OTHER PUBLICATIONS

D.E. Knuth, *The Art of Computer Programming,* vol. 3, Sorting and Searching, Addison–Wesley, Reading, Massachusetts, 1973, pp. 506–549.

R.L. Kruse, *Data Structures and Program Design,* Second Edition, Prentice–Hall, Englewood Cliffs, New Jersey, 1987, Section 6.5, "Hashing," and Section 6.6, Analysis of Hashing, pp. 198–215.

D. F. Stubbs and N.W. Webre, *Data Structure with Abstract Data Types and Pascal,* Brooks/Cole Publishing Company, Monterey, California, 1985, Section 7.4, "Hased Implementations," pp. 310–336.

*Primary Examiner*—Thomas G. Black
*Assistant Examiner*—Hosain T. Alam

[57] ABSTRACT

A method and apparatus for performing storage and retrieval in an information storage system is disclosed that uses the hashing technique with the external chaining method for collision resolution. In order to prevent performance deterioration due to the presence of automatically expiring data items, a garbage collection technique is used that removes all expired records stored in the system in the external chain targeted by a probe into the data storage system. More particularly, each insertion, retrieval, or deletion of a record is an occasion to search an entire linked-list chain of records for expired items and then remove them. Because an expired data item will not remain in the system long term if the system is frequently probed, it is useful for large information storage systems that are heavily used, require the fast access provided by hashing, and cannot be taken off-line for removal of expired data.

8 Claims, 6 Drawing Sheets

METHODS AND APPARATUS FOR INFORMATION STORAGE AND RETRIEVAL USING A HASHING TECHNIQUE WITH EXTERNAL CHAINING AND ON-THE-FLY REMOVAL OF EXPIRED DATA

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to information storage and retrieval systems, and, more particularly, to the use of hashing techniques in such systems.

Information or data stored in a computer-controlled storage mechanism can be retrieved by searching for a particular key value in the stored records. The stored record with a key matching the search key value is then retrieved. Such searching techniques require repeated access to records into the storage mechanism to perform key comparisons. In large storage and retrieval systems, such searching, even if augmented by efficient search procedures such as the binary search, often requires an excessive amount of time due to the large number of key comparisons required.

Another well-known and much faster way of storing and retrieving information from computer storage, albeit at the expense of additional storage, is the so-called "hashing" technique, also called scatter-storage or key-transformation method. In such a system, the key is operated on by a hashing function to produce a storage address in the storage space, called the hash table, which is a large one-dimensional array of record locations. This storage address is then accessed directly for the desired record. Hashing techniques are described in the classic text by D. E. Knuth entitled *The Art of Computer Programming*, Volume 3, Sorting and Searching, Addison-Wesley, Reading, Mass., 1973, pp. 506–549.

Hashing functions are designed to translate the universe of keys into addresses uniformly distributed throughout the hash table. Typical hashing functions include truncation, folding, transposition, and modulo arithmetic. A disadvantage of hashing is that more than one key will inevitably translate in the same storage address, causing "collisions" in storage. Some form of collision resolution must therefore be provided. For example, the simple strategy called "linear probing," which consists of searching forward from the initial storage address to the first empty storage location, is often used.

Another method for resolving collisions is called "external chaining." In this technique, each hash table location is a pointer to the head of a linked list of records, all of whose keys translate under the hashing function to that very hash table address. The linked list is itself searched sequentially when retrieving, inserting, or deleting a record. Insertion and deletion are done by adjusting pointers in the linked list. External chaining is discussed in considerable detail in the aforementioned text by D. E. Knuth, in *Data Structures and Program Design*, Second Edition, by R. L. Kruse, Prentice-Hall, Incorporated, Englewood Cliffs, N.J., 1987, Section 6.5, "Hashing," and Section 6.6, "Analysis of Hashing," pp. 198–215, and in *Data Structures with Abstract Data Types and Pascal*, by D. F. Stubbs and N. W. Webre, Brooks/Cole Publishing Company, Monterey, Calif., 1985, Section 7.4, "Hashed Implementations," pp. 310–336.

Some forms of information are such that individual data items, after a limited period of time, become obsolete, and their presence in the storage system is no longer needed or desired. Scheduling activities, for example, involve data that become obsolete once the scheduled event has occurred. An automatically-expiring data item, once it expires, needlessly occupies computer memory storage that could otherwise be put to use storing an unexpired item. Thus, expired items must eventually be removed to reclaim the storage for subsequent data insertions. In addition, the presence of many expired items results in needlessly long search times since the linked lists associated with external chaining will be longer than they otherwise would be. The goal is to remove these expired items to reclaim the storage and maintain fast access to the data.

The problem, then, is to provide the speed of access of hashing techniques for large, heavily used information storage systems having expiring data and, at the same time, prevent the performance degradation resulting from the accumulation of many expired records. Although a hashing technique for dealing with expiring data is known and disclosed in U.S. Pat. No. 5,121,495, issued Jun. 9, 1992, that technique is confined to linear probing and is entirely inapplicable to external chaining. The procedure shown there traverses, in reverse order, a consecutive sequence of records residing in the hash table array, continually relocating unexpired records to fill gaps left by the removal of expired ones.

Unlike arrays, linked lists leave no gaps when items from it are removed, and furthermore it is not possible to efficiently traverse a singly linked list in reverse order. There are significant advantages to external chaining over linear probing that sometimes make it the method of choice, as discussed in considerable detail in the aforementioned texts, and so hashing techniques for dealing with expiring data that do not use external chaining prove wholly inadequate for certain applications. For example, if the data records are large, considerable memory can be saved using external chaining instead of linear probing. Accordingly, there is a need to develop hashing techniques for external chaining with expiring data. The methods of the above-mentioned patent are limited to arrays and cannot be used with linked lists due to the significant difference in the organization of the computer's memory.

BRIEF SUMMARY OF THE INVENTION

In accordance with the illustrative embodiment of the invention, these and other problems are overcome by using a garbage collection procedure "on-the-fly" while other types of access to the storage space are taking place. In particular, during normal data insertion or retrieval probes into the data store, the expired, obsolete records are identified and removed from the external chain linked list. Specifically, expired or obsolete records in the linked list including the record to be accessed are removed as part of the normal search procedure.

This incremental garbage collection technique has the decided advantage of automatically eliminating unneeded records without requiring that the information storage system be taken off-line for such garbage collection. This is particularly important for information storage systems requiring rapid access and continuous availability to the user population.

More specifically, a method for storing and retrieving information records using a linked list to store and provide access to the records, at least some of the records automatically expiring, is disclosed. The method accesses the linked list of records and identifies at least some automatically expired ones of the records. It also removes at least some automatically expired ones of the records from the linked list when the linked list is accessed. Furthermore, the method provides for dynamically determining maximum number of expired ones of the records to be removed when the linked list is accessed.

BRIEF DESCRIPTION OF THE SEVERAL VIEWS OF THE DRAWING

A complete understanding of the present invention may be gained by considering the following detailed description in conjunction with the accompanying drawing, in which.

To facilitate reader understanding, identical reference numerals are used to designate elements common to the figures.

DETAILED DESCRIPTION OF THE INVENTION

Figure 1:
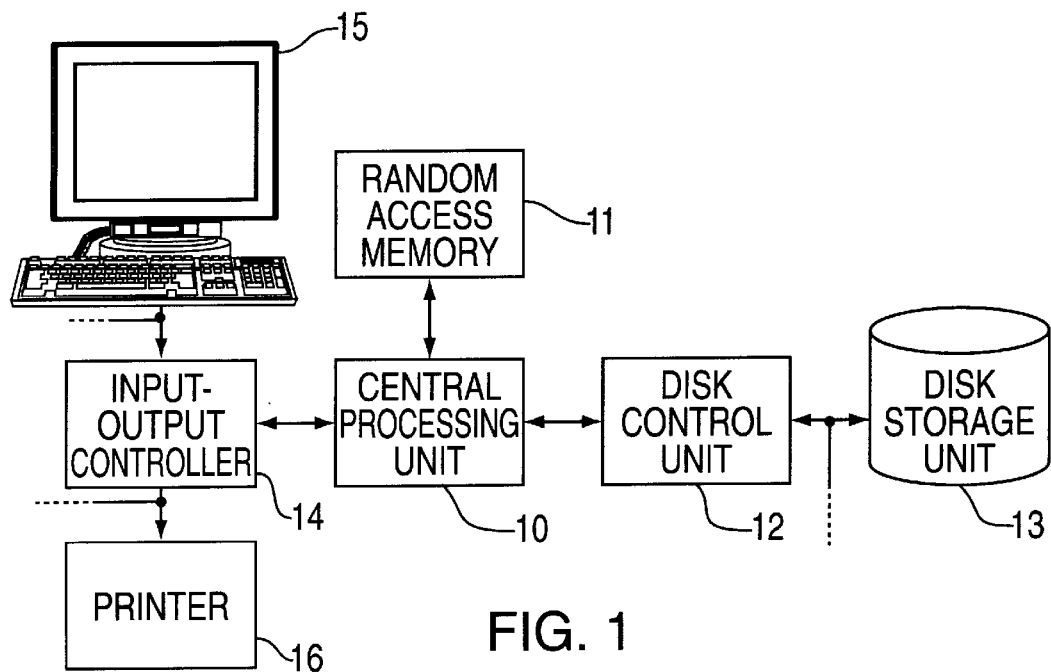
FIG. 1 shows a general block diagram of a computer system hardware arrangement in which the information storage and retrieval system of the present invention might be implemented.

FIG. 1 of the drawings shows a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated on by the program instructions accessed by CPU 10 from RAM 11, all in accordance with well-known data processing techniques.

Central Processing Unit (CPU) 10 also controls and accesses a disk controller unit 12 that, in turn, accesses a digital data stored on one or more disk storage units such as disk storage unit 13 until required by CPU 10. At this time, such programs and data are retrieved from disk storage unit 13 in blocks and stored in RAM 11 for rapid access.

Central Processing Unit (CPU) 10 also controls an Input/Output (I/O) controller 14 that, in turn, provides access to a plurality of input devices such as CRT (cathode ray tube) terminal 15, as well as a plurality of output devices such as printer 16. Terminal 15 provides a mechanism for a computer user to introduce instructions and commands into the computer system of FIG. 1, and may be supplemented with other input devices such as magnetic tape readers, remotely located terminals, optical readers, and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, laser printers, graphical plotters, and other types of output devices.

The constituents of the computer system of FIG. 1 and their cooperative operation are well-known in the art and are typical of all computer systems, from small personal computers to large mainframe systems. The architecture and operation of such systems are well-known and will not be further described here.

Figure 2:
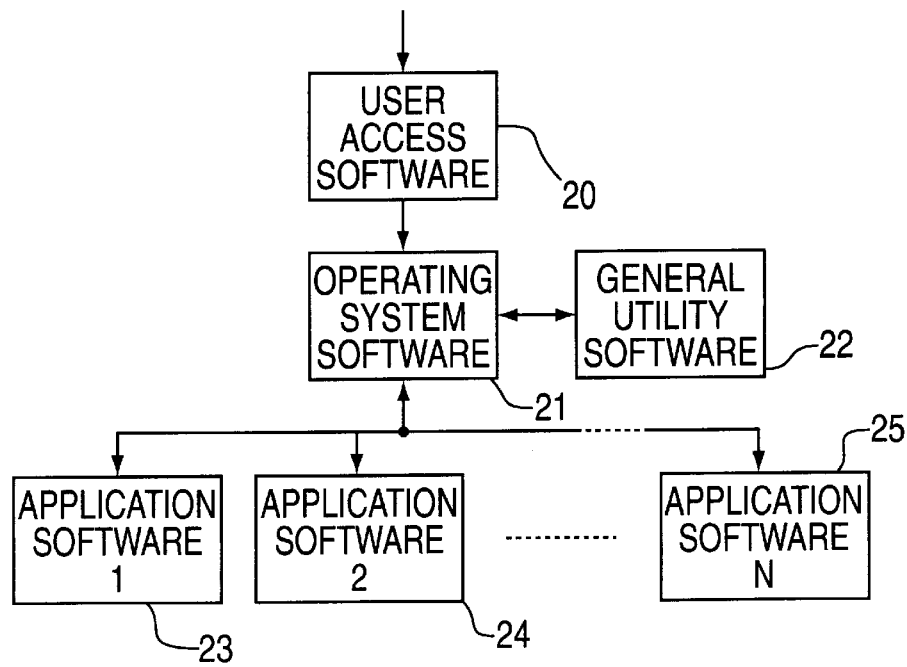
FIG. 2 shows a general block diagram of a computer system software arrangement in which the information storage and retrieval system of the present invention might find use.

FIG. 2 shows a graphical representation of a typical software architecture for a computer system such as that shown in FIG. 1. The software of FIG. 2 comprises a user access mechanism that, for simple personal computers, may consist of nothing more than turning the system on. In larger systems, providing service to many users, login and password procedures would typically be implemented in user access mechanism 20. Once user access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise basic file access and manipulation programs, system maintenance facilities, and programming language compilers.

The computer software system of FIG. 2 typically also includes application programs such as application software 23, 24, . . . , 25. Application software 23 through 25 might, for example, comprise a text editor, document formatting software, a spreadsheet program, a database management system, a game program, and so forth.

The present invention is concerned with information storage and retrieval. It can be application software packages 23–25, or used by other parts of the system, such as user access software 20 or operating system 21 software. The information storage and retrieval technique provided by the present invention are herein disclosed as flowcharts in FIGS. 3 through 7, and shown as PASCAL-like pseudocode in the APPENDIX to this specification.

Before proceeding to a description of one embodiment of the present invention, it is first useful to discuss hashing techniques in general. Many fast techniques for storing and retrieving data are known in the prior art. In situations where storage space is considered cheap compared with retrieval time, a technique called hashing is often used. In classic hashing, each record in the information storage system includes a distinguished field unique in value to each record, called the key, which is used as the basis for storing and retrieving the associated record. Taken as a whole, a hash table is a large, one-dimensional array of logically contiguous, consecutively numbered, fixed-size storage units. Such a table of records is typically stored in RAM 11 of FIG. 1, where each record is an identifiable and addressable location in physical memory. A hashing function translates the key into a hash table array subscript, which is used as an index into the array where searches for the data record begin. The hashing function can be any operation on the key that results in subscripts mostly uniformly distributed across the table. Known hashing functions include truncation, folding, transposition, modulo arithmetic, and combinations of these operations. Unfortunately, hashing functions generally do not produce unique locations in the hash table, in that many distinct keys map to the same location, producing what are called collisions. Some form of collision resolution is required in all hashing systems. In every occurrence of collision, finding an alternate location for a collided record is necessary. Moreover, the alternate location must be readily reachable during future searches for the displaced record.

A common collision resolution strategy, with which the present invention is concerned, is called external chaining. Under external chaining, each hash table entry stores all of the records that collided at that location by storing not the records themselves, but instead a pointer to the head of a linked list of those same records. Such linked lists are formed by storing the records individually in dynamically allocated storage and maintaining with each record a pointer to the location of the next record in the chain of collided records. When a search key is hashed to a hash table entry, the pointer found there is used to locate the first record. If the search key does not match the key found there, the pointer there is used to locate the second record. In this way, the "chain" of records is traversed sequentially until the desired record is found or until the end of the chain is reached. Deletion of records involves merely adjusting the pointers to bypass the deleted record and returning the storage it occupied to the available storage pool maintained by the system.

Hashing techniques have been used classically for very fast access to static, short term data such as a compiler symbol table. Typically, in such storage systems, deletions are infrequent and the need for the storage system disappears quickly. In some common types of data storage systems, however, the storage system is long lived and records can become obsolete merely by the passage of time or by the occurrence of some event. If such expired, lapsed, or obsolete records are not removed from the system, they will, in time, seriously degrade the performance of the retrieval system. Degradation shows up in two ways. First, the presence of expired records lengthens search times since they cause the external chains to be longer than they otherwise would be. Second, expired records occupy dynamically allocated memory storage that could be returned to the system memory pool for useful allocation. Thus, when the system memory pool is depleted, a new data item can be inserted into the storage system only if the memory occupied by an expired one is reclaimed.

Figure 3:
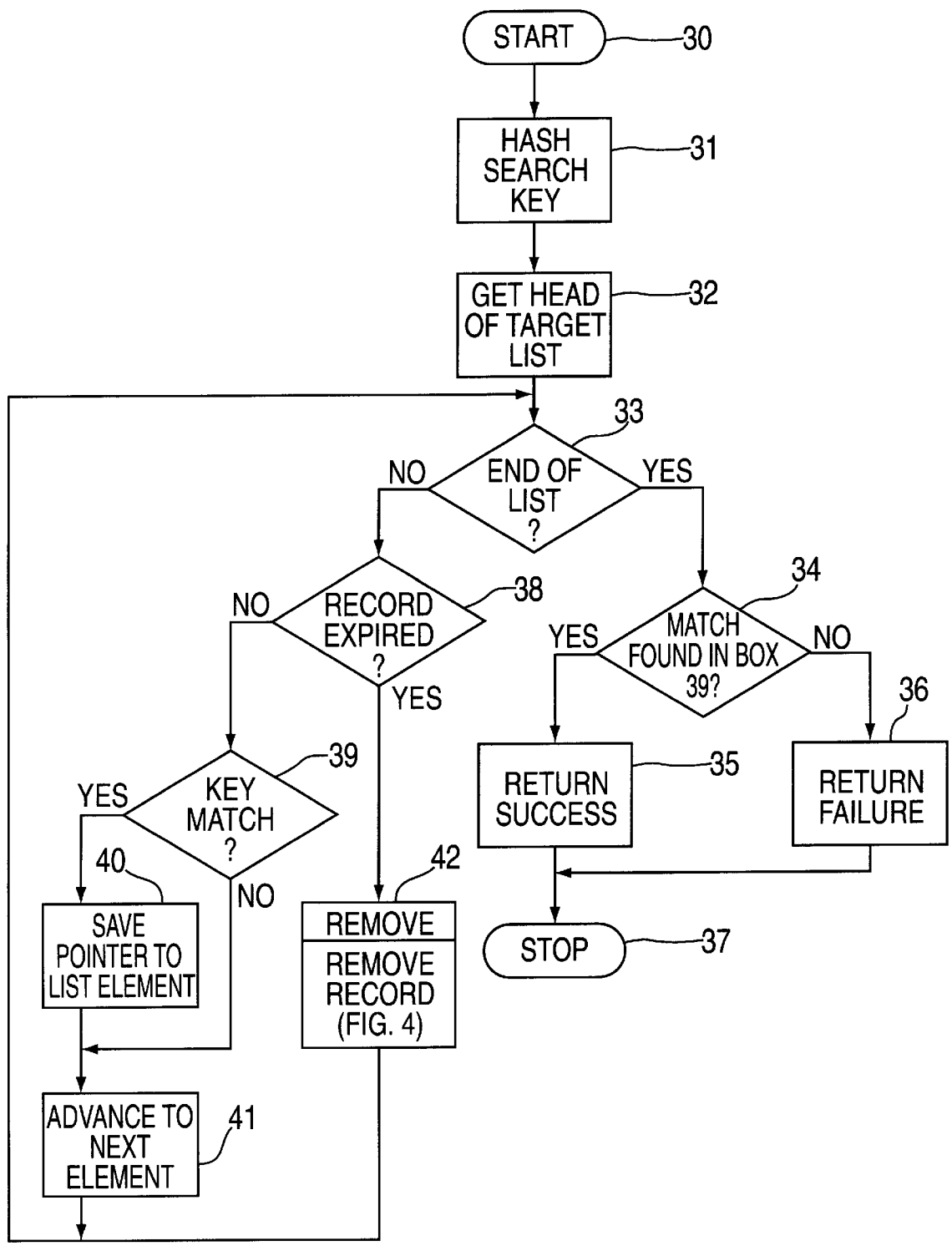
FIG. 3 shows a general flow chart for a table searching operation that might be used in a hashed storage system in accordance with the present invention.

Referring then to FIG. 3, there is shown a flowchart of a search table procedure for searching the hash table preparatory to inserting, retrieving, or deleting a record, in accordance with the present invention, and involving the dynamic removal of expired records in a targeted linked list. Starting in box 30 of the search table procedure of FIG. 3, the search key of the record being searched for is hashed in box 31 to provide the subscript of an array element. In box 32, the hash table array location indicated by the subscript generated in box 31 is accessed to provide the pointer to the target linked list. Decision box 33 examines the pointer value to determine whether the end of the linked list has been reached. If the end has been reached, decision box 34 is entered to determine if a key match was previously found in decision box 39 (as will be described below). If so, the search is successful and returns success in box 35, followed by the procedure's termination in terminal box 37. If not, box 36 is entered where failure is returned and the procedure again terminates in box 37.

If the end of the list has not been reached as determined by decision box 33, decision box 38 is entered to determine if the record pointed to has expired. This is determined by comparing some portion of the contents of the record to some external condition. A timestamp in the record, for example, could be compared with the current time-of-day value maintained by all computers. Alternatively, the occurrence of an event can be compared with a field identifying that event in the record. In any case, if the record has not expired, decision box 39 is entered to determine if the key in this record matches the search key. If it does, the address of the record is saved in box 40 and box 41 is entered. If the record does not match the search key, the procedure bypasses box 40 and proceeds directly to box 41. In box 41, the procedure advances forward to the next record in the linked list and the procedure returns to box 33.

If decision box 38 determines that the record under question has expired, box 42 is entered to perform the on-the-fly removal of the expired record from the linked list and the return of the storage it occupies to the system storage pool, as will be described in connection with FIG. 4. In general, the remove procedure of box 42 (FIG. 4) operates to remove an element from the linked list by adjusting its predecessor's pointer to bypass that element. (However, if the element to be removed is the first element of the list, then there is no predecessor and the hash table array entry is adjusted instead.) On completion of procedure remove invoked from box 42, the search table procedure returns to box 33.

It can be seen that the search table procedure of FIG. 3 operates to examine the entire linked list of records of which the searched-for record is a part, and to remove expired records, returning storage to the storage pool with each removal. If the storage pool is depleted and many expired records remain despite such automatic garbage collection, then the insertion of new records is inhibited (boxes 76 and 77 of FIG. 5) until a deletion is made by the delete procedure (FIG. 7) or until the search table procedure has had a chance to replenish the storage pool through its on-the-fly garbage collection.

Though the search table procedure as shown in FIG. 3, implemented in the APPENDIX as PASCAL-like pseudocode, and described above appears in connection with an information storage and retrieval system using the hashing technique with external chaining, its on-the-fly removal technique while traversing a linked list can be used anywhere a linked list of records with expiring data appears, even in contexts unrelated to hashing. A person skilled in the art will appreciate that this technique can be readily applied to manipulate linked lists not necessarily used with hashing.

The search table procedure shown in FIG. 3, implemented as pseudocode in the APPENDIX, and described above traverses the entire linked list removing all expired records as it searches for a key match. The procedure can be readily adapted to remove some but not all of the expired records, thereby shortening the linked list traversal time and speeding up the search at the expense of perhaps leaving some expired records in the list. For example, the procedure can be modified to terminate when a key match occurs. (PASCAL-like pseudocode for this alternate version of search table appears in the APPENDIX.) The implementor even has the prerogative of choosing among these strategies dynamically at the time search table is invoked by the caller, thus sometimes removing all expired records, at other times removing some but not all of them, and yet at other times choosing to remove none of them. Such a dynamic runtime decision might be based on factors such as, for example, how much memory is available in the system storage pool, general system load, time of day, the number of records currently residing in the information system, and other factors both internal and external to the information storage and retrieval system itself A person skilled in the art will appreciate that the technique of removing all expired records while searching the linked list can be expanded to include techniques whereby not necessarily all expired records are removed, and that the decision regarding if and how many records to delete can be a dynamic one.

Figure 4:
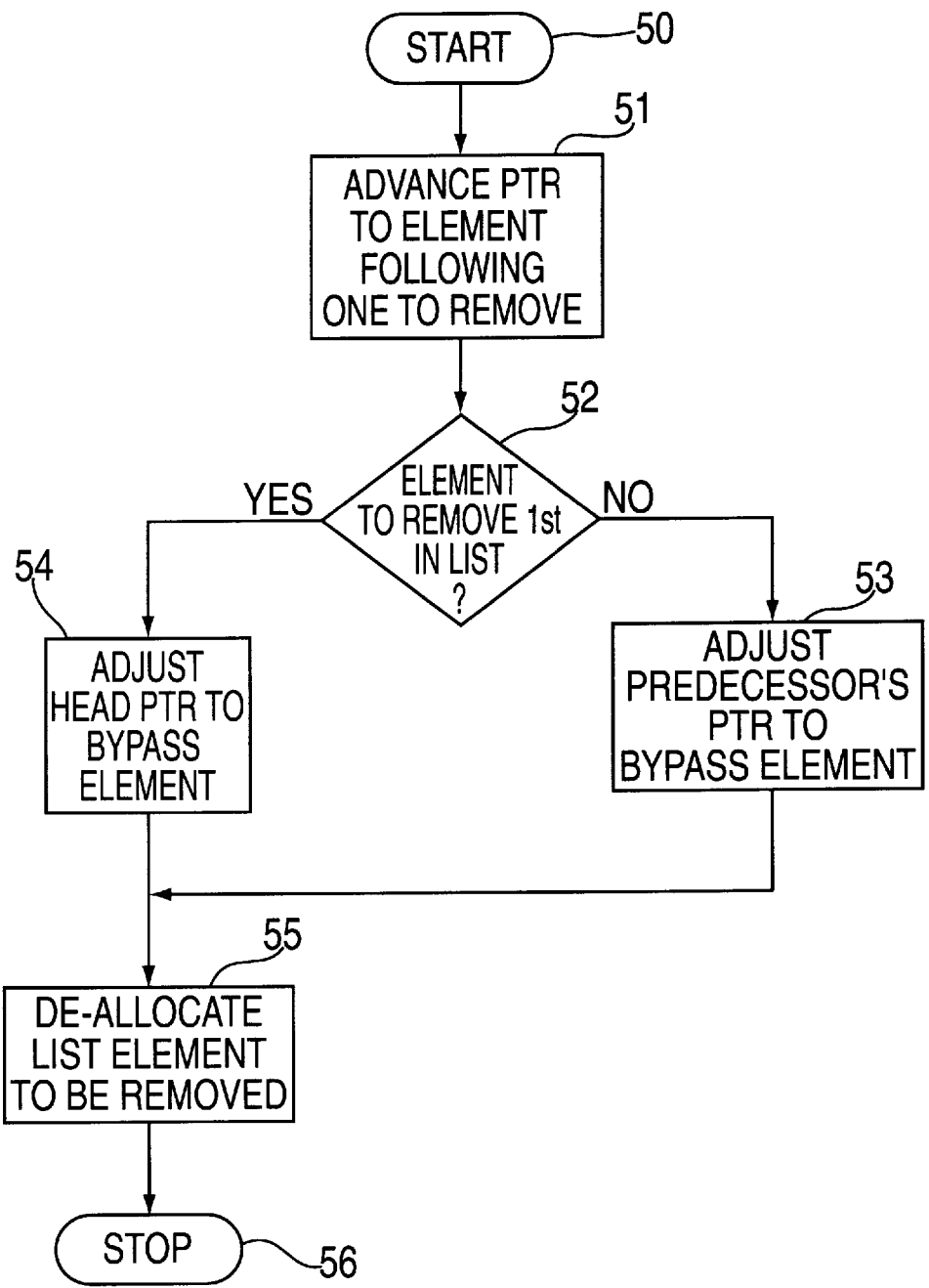
FIG. 4 shows a general flow chart for a linked-list element remove procedure that forms part of the table searching operation of FIG. 3.
Figure 7:
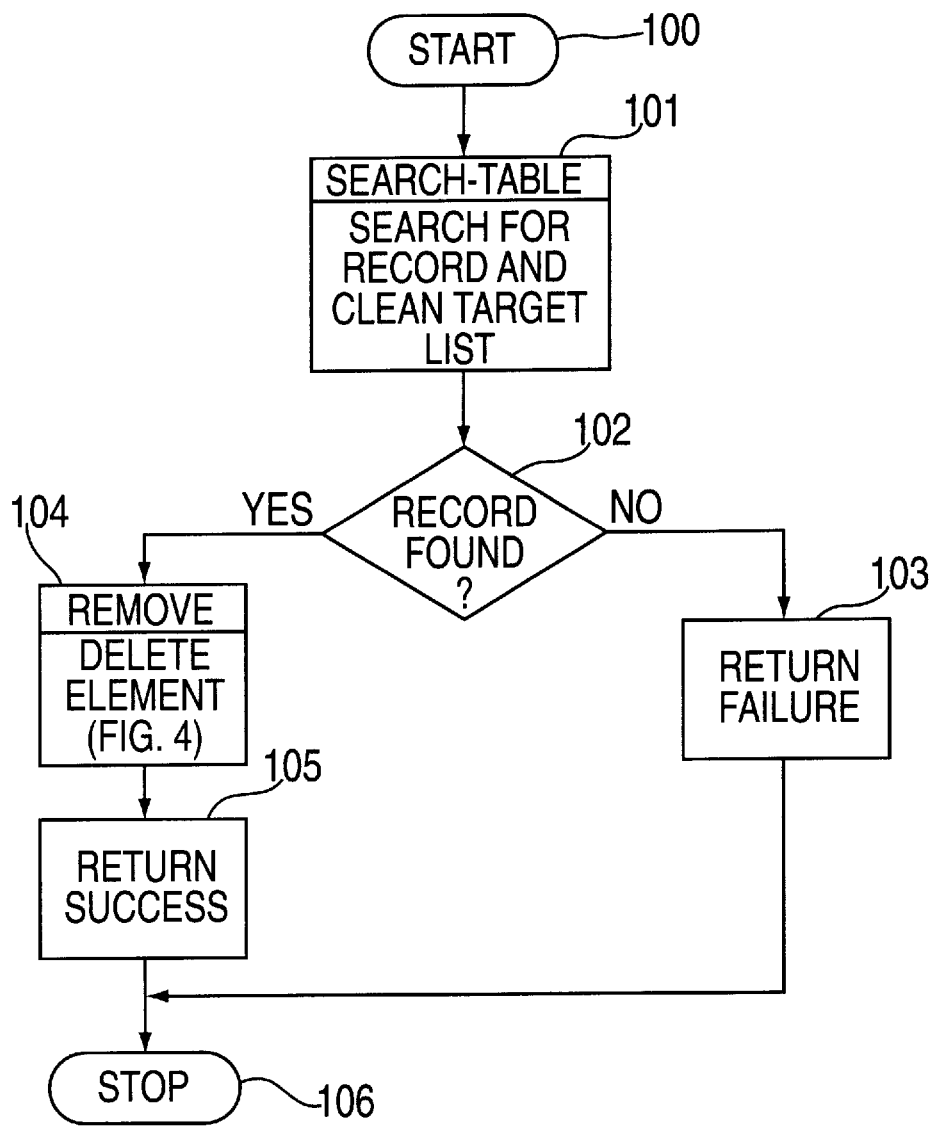
FIG. 7 shows a general flow chart for a record deletion operation that might be used in a hashed storage system in accordance with the present invention.

In FIG. 4 there is shown a flowchart of a remove procedure that removes a record from the retrieval system, either an unexpired record through the delete procedure as will be noted in connection with FIG. 7, or an expired record through the search table procedure as noted in connection with FIG. 3. In general, this is accomplished by the invoking procedure, being either the delete procedure (FIG. 7) or the search table procedure (FIG. 3), passing to the remove procedure a pointer to a linked list element to remove, a pointer to that element's predecessor element in the same linked list, and the subscript of the hash table array location containing the pointer to the head of the linked list from which the element is to be removed. In the case that the element to be removed is the first element of the linked list, the predecessor pointer passed to the remove procedure by the invoking procedure has the NIL (sometimes called NULL, or EMPTY) value, indicating to the remove procedure that the element to be removed has no predecessor in the list. The invoking procedure expects the remove procedure, on completion, to have advanced the passed pointer that originally pointed to the now-removed element so that it points to the successor element in that linked list, or NIL if the removed element was the final element. (The search table procedure of FIG. 3, in particular, makes use of the remove procedure's advancing this passed pointer in the described way; it is made use of in that box 33 of FIG. 3 is entered directly following completion of box 42, as was described above in connection with FIG. 3.)

The remove procedure causes actual removal of the designated element by adjusting the predecessor pointer so that it bypasses the element to be removed. In the case that the predecessor pointer has the NIL value, the hash table array entry indicated by the passed subscript plays the role of the predecessor pointer and is adjusted the same way in its stead. Following pointer adjustments, the storage occupied by the removed element is returned to the system storage pool for future allocation.

Beginning, then, at starting box 50 of FIG. 4, the pointer to the list element to remove is advanced in box 51 so that it points to its successor in the linked list. Next, decision box 52 determines if the element to remove is the first element in the containing linked list by testing the predecessor pointer for the NIL value, as described above. If so, box 54 is entered to adjust the linked list head pointer in the hash table array to bypass the first element, after which the procedure continues on to box 55. If not, box 53 is entered where the predecessor pointer is adjusted to bypass the element to remove, after which the procedure proceeds, once again, to box 55. Finally, in box 55 the storage occupied by the bypassed element is returned to the system storage pool and the procedure terminates in terminal box 56.

Figure 5:
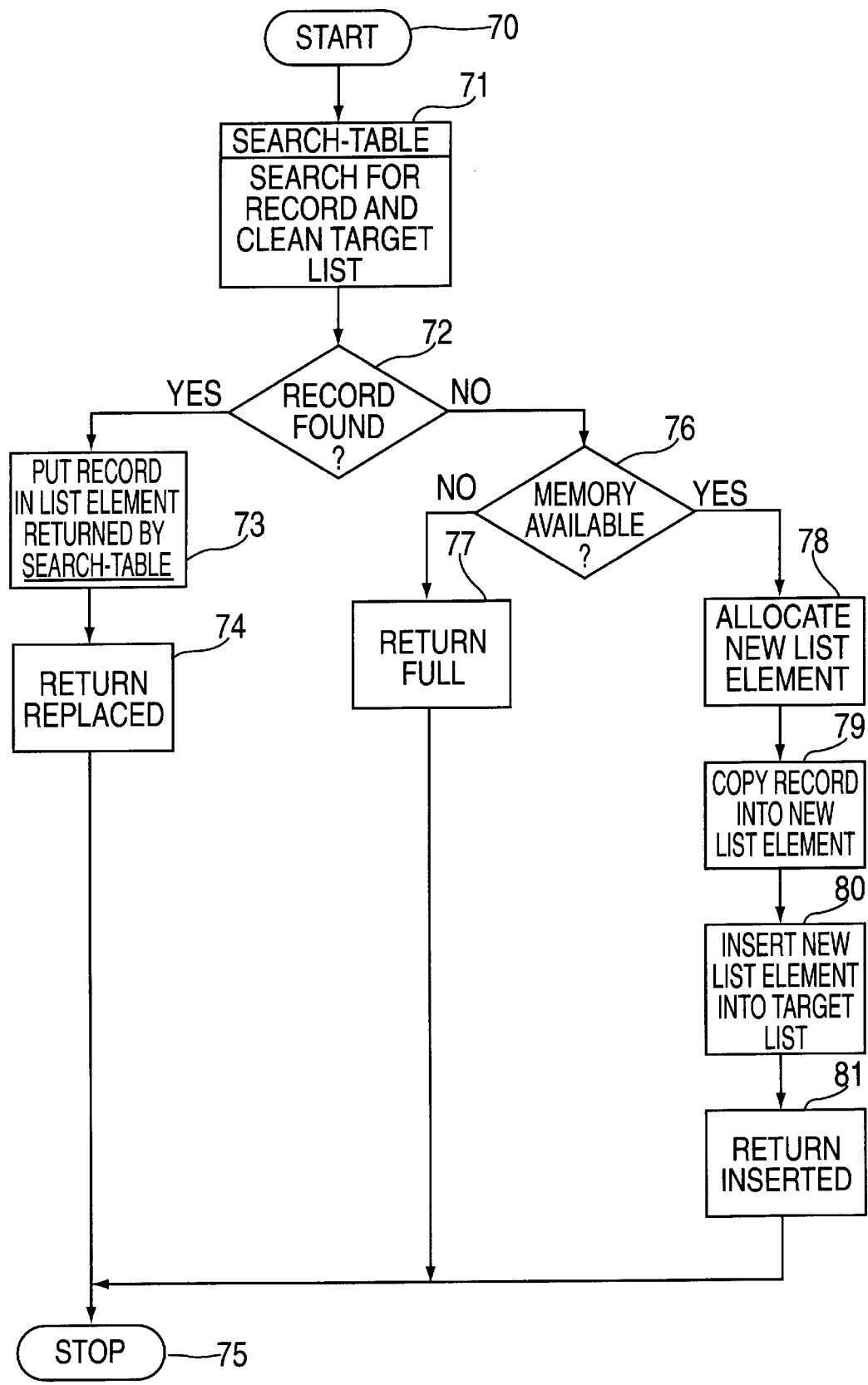
FIG. 5 shows a general flow chart for a record insertion operation that might be used in a hashed storage system in accordance with the present invention.

FIG. 5 shows a detailed flowchart of an insert procedure suitable for use in the information storage and retrieval system of the present invention. The insert procedure of FIG. 5 begins at staring box 70 from which box 71 is entered. In box 71, the search table procedure of FIG. 3 is invoked with the search key of the record to be inserted. As noted in connection with FIG. 3, the search table procedure finds the linked list element whose key value of the record contained therein matches the search key and, at the same time, removes expired records on-the-fly from that linked list. Decision box 72 is then entered where it is determined whether the search table procedure found a record with matching key value. If so, box 73 is entered where the record to be inserted is put into the linked list element in the position of the old record with matching key value. In box 74, the insert procedure reports that the old record has been replaced by the new record and the procedure terminates in terminal box 75.

Returning to decision box 72, if a matching record is not found, decision box 76 is entered to determine if there is sufficient storage in the system storage pool to accommodate a new linked list element. If not, box 77 is entered to report that the storage system is full and the record cannot be inserted. Following that, the procedure terminates in terminal box 75.

If decision box 76 determines that sufficient storage can be allocated from the system storage pool for a new linked list element, then box 78 is entered where the actual memory allocation is made. In box 79, the record to be inserted is copied into the storage allocated in box 78, and box 80 is entered. In box 80, the linked list element containing the record copied into it in box 79 is inserted into the linked list to which the contained record hashed. The procedure then reports that the record was inserted into the information storage and retrieval system in box 81 and the procedure terminates in box 75.

Figure 6:
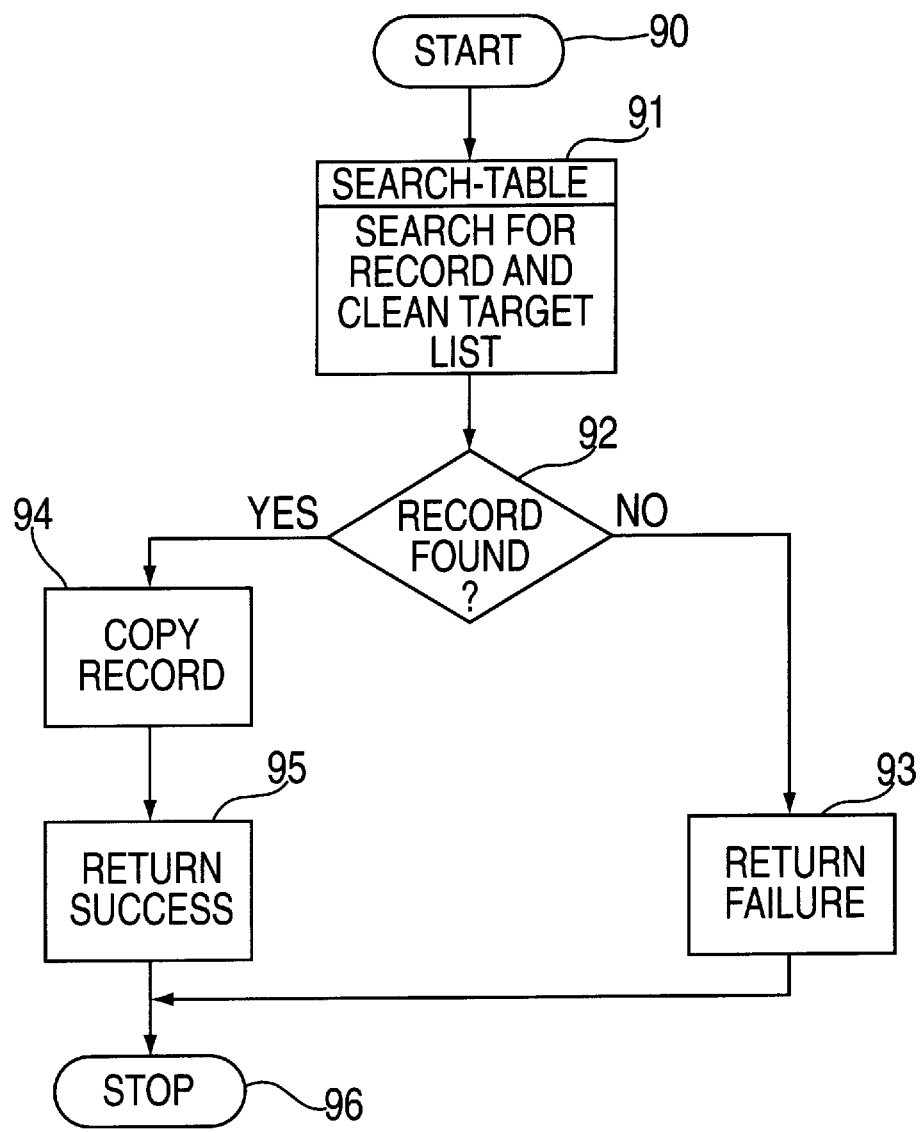
FIG. 6 shows a general flow chart for a record retrieval operation for use in a hashed storage system in accordance with the present invention.

FIG. 6 shows a detailed flowchart of a retrieve procedure used to retrieve a record from the information storage and retrieval system. Starting in box 90, the search table procedure of FIG. 3 is invoked in box 91, using the key of the record to be retrieved as the search key. In decision box 92 it is determined if a record with a matching key was found by the search table procedure. If not, box 93 is entered to report failure of the retrieve procedure, and the procedure terminates in terminal box 96. If a matching record was found, box 94 is entered to copy the matching record into a record store for processing by the calling program, box 95 is entered to return an indication of successful retrieval, and the procedure terminates in terminal box 96.

FIG.7 shows a detailed flowchart of a delete procedure useful for actively removing records from the information storage and retrieval system. Starting at box 100, the procedure of FIG. 7 invokes the search table procedure of FIG. 3 in box 101, using the key of the record to be deleted as the search key. In decision box 102, it is determined if the search table procedure was able to find a record with matching key. If not, box 103 is entered to report failure of the deletion procedure, and the procedure terminates in terminal box 106. If a matching record was found, as determined by decision box 102, the remove procedure of FIG. 4 is invoked in box 104. As noted in connection with FIG. 4, the remove procedure causes removal of a designated linked list element from its containing linked list. Box 105 is then entered to report successful deletion to the calling program, and the procedure terminates in terminal box 106.

The attached APPENDIX contains PASCAL-like pseudocode listings for all of the programmed components necessary to implement an information storage and retrieval system operating in accordance with the present invention. Any person of ordinary skill in the art will have no difficulty implementing the disclosed system and procedures shown in the APPENDIX, including programs for all common hardware and system software arrangements, on the basis of this description, including flowcharts and information shown in the APPENDIX.

It should also be clear to those skilled in the art that other embodiments of the present invention may be made by those skilled in the art without departing from the teachings of the present invention. It is also clear to those skilled in the art that the invention can be used in diverse computer applications, and that it is not limited to the use of hash tables, but is applicable to other techniques requiring linked lists with expiring records.

---

Appendix

Functions Provided

The following functions are made available to the application program:
1. insert (record: record_type)
    Returns replaced if a record associated with record.key was found and
    subsequently replaced.
    Returns inserted if a record associated with record.key was not found and the
    passed record was subsequently inserted.
    Returns full if a record associated with record.key was not found and the passed
    record could not be inserted because no memory is available.
2. retrieve (record: record_type)
    Returns success if record associated with record.key was found and assigned to
    record.
    Returns failure if search was unsuccessful.
3. delete (record_key: record_key_type)
    Returns success if record associated with record_key was found and subse-
    quently deleted.
    Returns failure if not found.

Definitions

The following formal definitions are required for specifying the insertion, retrieval, and deletion procedures. They are global to all procedures and functions shown below.
1. const table_size                                                              /* Size of hash table. */
2. type list_element_pointer = ↑ list_element                                    /* Pointer to elements of linked list. */
3. type list_element =                                                           /* Each element of linked list. */
    record
        record_contents: record_type;
        next: list_element_pointer                                               /* Singly-linked list. */
    end
4. var table: array [0 . . . table_size − 1] of list_element_pointer             /* Hash table. */
                                                                                 /* Each array entry is pointer to head of list. */
    Initial state of table: table[i] = nil ∀ i 0 ≦ i < table_size                /* Initially empty. */

Insert Procedure

```
function insert (record: record_type): (replaced, inserted, full);
    var position: list_element_pointer;                              /* Pointer into list of found record, */
                                                                     /* or new element if not found. */
        dummy_pointer: list_element_pointer;                         /* Don't need position's predecessor. */
        index: 0 . . . table_size − 1;                               /* Table index mapped to by hash function. */
    begin
        if search_table (record.key, position, dummy_pointer, index)      /* Record already exist? */
            then begin                                                    /* Yes, update it with passed record. */
                position↑ .record_contents := record;
                return (replaced)
            end
        else                                                         /* No, insert new record at head of list, */
            if no memory available then return (full)                /* if memory available to do so. */
            else begin                                               /* Memory is available for a node. */
                new(position);                                       /* Dynamically allocate new node. */
                position↑ .record_contents := record;                /* Hook it in. */
                position↑ .next := table[index];
                table[index] := position;
                return (inserted)
            end                                                      /* else begin */
    end                                         /* insert */
```

Retrieve Procedure

```
function retrieve (var record: record_type): (success, failure);
    var position: list_element_pointer;                              /* Pointer into list of found record. */
        dummy_pointer: list_element_pointer;                         /* Don't need position's predecessor. */
        dummy_index: 0 . . . table_size − 1;                         /* Don't need table index mapped to by hash function. */
    begin
        if search_table (record.key, position, dummy_pointer, dummy_index)     /* Record exist? */
            then begin                                                         /* Yes, return it to caller. */
                record := position↑ .record_contents;
                return (success)
            end
            else return (failure)                                    /* No, report failure. */
    end                                         /* retrieve */
```

Appendix

Delete Procedure

```
function delete (record_key: record_key_type): (success,failure);
    var position: list_element_pointer;                       /* Pointer into list of found record. */
        previous_position: list_element_pointer;              /* Points to position's predecessor. */
        index: 0 . . . table_size - 1;                        /* Table index mapped to by hash function. */
    begin
        if search_table (record_key, position, previous_position, index)    /* Record exist? */
            then begin                                                      /* Yes, remove it. */
                remove (position, previous_position, index);
                return (success)
            end
            else return (failure)                             /* No, report failure. */
    end                                                       /* delete */
```

Search Table Procedure

```
function search_table (record_key: record_key_type;
                       var position: list_element_pointer;
                       var previous_position: list_element_pointer;
                       var index: 0 . . . table_size - 1): boolean;
/*  Search table for record_key and delete expired records in target list; if found, position is made to
    point to located record and previous_position to its predecessor, and TRUE is returned; otherwise
    FALSE is returned. index is set to table subscript that is mapped to by hash function in either
    case. */
var p: list_element_pointer;                                  /* Used for traversing chain. */
    previous_p: list_element_pointer;                         /* Points to p's predecessor. */
begin
    index := hash (record_key);             /* hash returns value in the range 0 . . . table_size - 1. */
    p := table[index];                                        /* Initialization before loop. */
    previous_p := nil;                                        /* Ditto */
    position := nil;                                          /* Ditto */
    previous_position := nil;                                 /* Ditto */
    while p ≠ nil                     /* HEART OF THE TECHNIQUE: Traverse entire list, deleting */
                                      /* expired records as we search. */
        begin
            if p↑ .record_contents is expired
                then remove (p, previous_p, index)    /* ON-THE-FLY REMOVAL OF EXPIRED RECORD! */
                else begin
                    if position = nil then if p↑ .record_contents.key = record_key
                                                          /* If this is record wanted,*/
                        then begin position := p; previous_position := previous_p end;
                                                          /* save its position. */
                    previous_p := p;                      /* Advance to */
                    p := p↑ .next                         /* next record. */
                end                                       /* else begin */
        end;
    return (position ≠ nil)              /* Return TRUE if record located, otherwise FALSE. */
end                                      /* search_table */
```

Alternate Version of Search Table Procedure

```
function search_table (record_key: record_key_type;
                       var position: list_element_pointer;
                       var previous_position: list_element_pointer;
                       var index: 0 . . . table_size - 1): boolean;
/*  SAME AS VERSION SHOWN ABOVE EXCEPT THAT THE SEARCH TERMINATES IF
    RECORD IS FOUND, INSTEAD OF ALWAYS TRAVERSING THE ENTIRE CHAIN. */
var p: list_element_pointer;                                  /* Used for traversing chain. */
    previous_p: list_element_pointer;                         /* Points to p's predecessor. */
begin
    index := hash (record_key);             /* hash returns value in the range 0 . . . table_size - 1. */
    p := table[index];                                        /* Initialization before loop. */
    previous_p := nil;                                        /* Ditto */
    position := nil;                                          /* Ditto */
    previous_position := nil;                                 /* Ditto */
    while p ≠ nil                         /* HEART OF THE TECHNIQUE: Traverse list, deleting */
                                          /* expired records as we search. */
        begin
            if p↑ .record_contents is expired
                then remove (p, previous_p, index)    /* ON-THE-FLY REMOVAL OF EXPIRED RECORD! */
                else begin
                    if p↑ .record_contents.key = record_key   /* If this is record wanted,*/
                        then begin                            /* save its position. */
                            position := p;
                            previous_position := previous_p;
                            return (true)          /* We found the record, so terminate search. */
                        end;
                    previous_p := p;                          /* Advance to */
                    p := p↑ .next                             /* next record. */
```

-continued

Appendix

```
            end                                                      /* else begin */
        end;
        return (false)                                              /* Record not found. */
    end                                   /* search_table */
                        Remove Procedure procedure remove (var elem_to_del: list_element_pointer;
                      previous_elem: list_element_pointer;
                      index: 0 . . . table_size - 1);
/*  Delete elem_to_del↑ from list, advancing elem_to_del to next element. previous_elem points to
    elem_to_del's predecessor, or nil if elem_to_del↑ is 1ˢᵗ element in list.*/
var p: list_element_pointer;                          /* Save pointer to elem_to_del for disposal. */
begin
    p : = elem_to_del;                    /* Save so we can dispose when finished adjusting pointers. */
    elem_to_del : = elem_to_del↑ .next;
    if previous_elem = nil                              /* Deleting 1ˢᵗ element requires changing */
        then table[index] := elem_to_del                  /* head pointer, as opposed to */
        else previous_elem↑ .next := elem_to_del;          /* predecessor's next pointer. */
    dispose (p)                                     /* Dynamically de-allocate node. */
end                                   /* remove*/
```

I claim:

1. An information storage and retrieval system, the system comprising:

a linked list to store and provide access to records stored in a memory of the system, at least some of the records automatically expiring, a record search means utilizing a search key to access the linked list, the record search means including a means for identifying and removing at least some of the expired ones of the records from the linked list when the linked list is accessed, and means, utilizing the record search means, for accessing the linked list and, at the same time, removing at least some of the expired ones of the records in the linked list.

2. The information storage and retrieval system according to claim 1 further including means for dynamically determining maximum number for the record search means to remove in the accessed linked list of records.

3. A method for storing and retrieving information records using a linked list to store and provide access to the records, at least some of the records automatically expiring, the method comprising the steps of:

accessing the linked list of records, identifying at least some of the automatically expired ones of the records, and removing at least some of the automatically expired records from the linked list when the linked list is accessed.

4. The method according to claim 3 further including the step of dynamically determining maximum number of expired ones of the records to remove when the linked list is accessed.

5. An information storage and retrieval system, the system comprising:

a hashing means to provide access to records stored in a memory of the system and using an external chaining technique to store the records with same hash address, at least some of the records automatically expiring, a record search means utilizing a search key to access a linked list of records having the same hash address, the record search means including means for identifying and removing at least some expired ones of the records from the linked list of records when the linked list is accessed, and meals, utilizing the record search means, for inserting, retrieving, and deleting records from the system and, at the same time, removing at least some expired ones of the records in the accessed linked list of records.

6. The information storage and retrieval system according to claim 5 further including means for dynamically determining maximum number for the record search means to remove in the accessed linked list of records.

7. A method for storing and retrieving information records using a hashing technique to provide access to the records and using an external chaining technique to store the records with same hash address, at least some of the records automatically expiring, the method comprising the steps of:

accessing a linked list of records having same hash address, identifying at least some of the automatically expired ones of the records, removing at least some of the automatically expired records from the linked list when the linked list is accessed, and inserting, retrieving or deleting one of the records from the system following the step of removing.

8. The method according to claim 7 further including the step of dynamically determining maximum number of expired ones of the records to remove when the linked list is accessed.

* * * * *

(12) EX PARTE REEXAMINATION CERTIFICATE (8148th)
United States Patent
Nemes

(10) Number: US 5,893,120 C1
(45) Certificate Issued: Apr. 12, 2011

(54) METHODS AND APPARATUS FOR INFORMATION STORAGE AND RETRIEVAL USING A HASHING TECHNIQUE WITH EXTERNAL CHAINING AND ON-THE-FLY REMOVAL OF EXPIRED DATA

(76) Inventor: Richard Michael Nemes, Brooklyn, NY (US)

Reexamination Request:
No. 90/010,856, Feb. 9, 2010

Reexamination Certificate for:
Patent No.: 5,893,120
Issued: Apr. 6, 1999
Appl. No.: 08/775,864
Filed: Jan. 2, 1997

(51) Int. Cl.
*G06F 17/30* (2006.01)

(52) U.S. Cl. .............................. 707/999.001; 707/999.1; 707/999.101; 707/999.202; 707/999.206; 707/E17.036

(58) Field of Classification Search ........................ None
See application file for complete search history.

(56) References Cited

U.S. PATENT DOCUMENTS

| | | | |
|---|---|---|---|
| 4,695,949 | A | 9/1987 | Thatte et al. |
| 4,989,132 | A | 1/1991 | Mellender et al. |
| 4,996,663 | A | 2/1991 | Nemes |
| 5,043,885 | A | 8/1991 | Robinson |
| 5,701,432 | A | 12/1997 | Wong et al. |
| 5,724,538 | A | 3/1998 | Morris et al. |
| 5,765,174 | A | 6/1998 | Bishop |
| 5,778,430 | A | 7/1998 | Ish et al. |
| 5,881,241 | A | 3/1999 | Corbin |
| 5,991,775 | A | 11/1999 | Beardsley et al. |
| 6,119,214 | A | 9/2000 | Dirks |
| 6,243,667 | B1 | 6/2001 | Kerr et al. |

OTHER PUBLICATIONS

John A. Morrison, Larry A. Shepp, and Christopher J. Van Wyk, A Queing Analysis of Hashing with Lazy Deletion, 16 Siam J. Comput. 6, 1155–1164, Dec. 1997.

Johnson, T. et al.; A Distributed, Replicated, Data–Balanced Search Structure; pp. 1–27.

Appel, A. W., et al.; Hash–consing Garbage Collection, pp. 1–18; Feb. 1993.

Bays, C.; Some Techniques for Structuring Chained Hash Tables; The Computer Journal; vol. 16.; No. 2; pp. 126–131; Apr. 1972.

Bastani, F. B. et al.; Concurrent Maintenance of Data Structures in a Distributed Environment; The Computer Journal; vol. 31; No. 2; 1988; pp. 165–174.

Kruse, R. L., et al.; CD–ROM Prepared by Mailhot, P.A.; Prentice Hall—Data Structures and Program Design in C++; 2000; 717 Pgs.

Kirsch, A., et al; Hash–Based Techniques for High–Speed Packet Processing; pp. 1–40.

Seligmann, J., et al.; Incremental Mature Garbage Collection Using the Train Algorithm; 1995; pp. 235–252.

Bohannon, P., et al.; The Architecture of the Dali Main– Memory Storage Manager; 1997; pp. 115–151.

(Continued)

*Primary Examiner*—Alexander J Kosowski

(57) ABSTRACT

A method and apparatus for performing storage and retrieval in an information storage system is disclosed that uses the hashing technique with the external chaining method for collision resolution. In order to prevent performance deterioration due to the presence of automatically expiring data items, a garbage collection technique is used that removes all expired records stored in the system in the external chain targeted by a probe into the data storage system. More particularly, each insertion, retrieval, or deletion of a record is an occasion to search an entire linked-list chain of records for expired items and then remove them. Because an expired data item will not remain in the system long term if the system is frequently probed, it is useful for large information storage systems that are heavily used, require the fast access provided by the hashing, and cannot be taken off-line for removal of expired data.

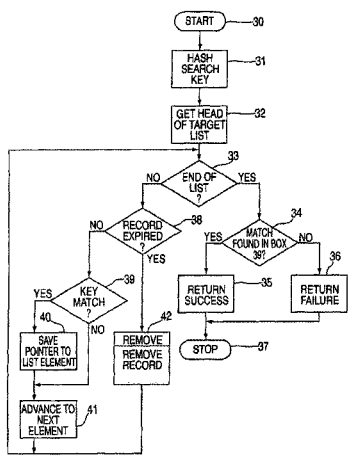

OTHER PUBLICATIONS

Van Wyk, C. J., et al.; Algorithmica—The Complexity of Hashing with Lazy Deletion; 1986; pp. 17–29.
Szymanski, T. G., et al.; Special Feature: Goalie: A Space Efficient System for VLSI Artwork Analysis; 1985; pp. 64–72.
van Rijsbergen, C. J.; Department of Computing Science—University of Glasgow; Information Retrieval; pp. 1–147.
Jannick, J.; Sigmond Record, vol. 24, No. 1; Implementing Deletion in B+–Trees; Mar. 1995; pp. 33–38.
Rusling; D. A.; The Linux Kernel; Version 0.8–3; pp. 1–176.
Chandranmenon, G. P.; et al.; IEEE/ACM Transactions on Networking, vol. 4, No. 2; Trading Packet Headers for Packet Processing; pp. 141–152; 1996.
Ramakrishna, M. V.; Hashing in Practice, Analysis of Hashing and Universal Hashing; 1988; pp. 191–199.
Varghese, G., et al.; Hashed and Hierarchical Timing Wheels: Data Structures for the Efficient Implementation of a Timer Facility; 1987; pp. 25–38.
Waldvogel, M., et al.; Scalable High Speed IP Routing Lookups; 1997; pp. 25–36.
Fagin, R., et al.; ACM Transactions on Database Systems, vol. 4, No. 3; Extendible Hashing—A Fast Access Method for Dynamic Files; Sep. 1979; pp. 315–344.
Schimdt, J .P., et al.; On Aspects of Universality and Performance for Closed Hashing; 1989; pp. 355–366.
Larson, P. A; Algorithms and Data Structures; Dynamic Hash Tables, vol. 31, No. 4; Apr. 1988; pp. 446–457.
Chiang, K. W., et al.; Time Efficient VLSI Artwork Analysis Algorithms in GOALIE2; 1988; pp. 471–476.
Maurer, W. D. et al; Computing Surveys, vol, 7, No. 1; Hash Table Methods; Mar. 1975; pp. 5–19.
Deutsch, L. P., et al.; Communications of the ACM, vol. 19, No. 9; An Efficient, Incremental, Automatic Garbage Collector; Sep. 1976; pp. 522–525.
Graham, S. L., et al.; Communications of the ACM, vol. 21, No. 7; Pseudochaining in Hash Tables; Jul. 1978; pp. 554–557.
Yao, A.; Journal of the Association for Computing Machinery, vol. 28, No. 3; Should Tables be Sorted!; Jul. 1981; pp. 615–628.
Karger, D., et al; Consistent Hasing and Random Trees: Distributed Caching Protocols for Relieving Hot Spots on the World Wide Web; 1997; pp. 654–663.
Celis, P., et al; Information Sciences 62, The Analysis of Hashing with Lazy Deletions; 1992; pp.13–36.
Albers, S., et al.; Self–Organizing Data Structures; pp. 1–39.
Seltzer, M.; A New Hashing Package for UNIX; Winter '91; pp. 173–184.

Tamassia, R.; ACM Computing Surveys, vol. 28, No. 1; Data Structures; Mar. 1996; pp. 23–26
Morrison, J. A., et al., et al; SIAM J. Comp. vol. 16, No. 6—A Queuing Analysis of Hashing with Lazy Deletion; Dec. 1987; pp. 1155–1164.
Dietzfelbinger, M., et al.; Dynamic Perfect Hashing: Upper and Lower Bounds, Revised Version; Jan. 7, 1990; pp. 1–33.
Kenyon–Mathieu, C.M., et al.; General Methods for the Analysis of the Maximum Size of Dynamic Data Structures; pp. 473–487.
Aldous, D., et al.; SIAM J Comp., vol. 21, No. 4, Maximum Size of a Dynamic Data Structure: Hashing with Lazy Deletion Revisited*; Aug. 1992; pp. 713–732.
Printout—Ethernet Address Resolution Protocol; 7 Pgs.
Printout—Copyright (c) 1989, 1993—The Regents of University of California; Copyright (c) 1995—Paul Henning Kamp; 6 Pgs.
Printout—Copyright (c) 1994 by Florian La Roche; pp. 1–20.
Brown, E. W.; Execution Performance Issues in Full–Text Information Retrieval—Technical Report 95–81; Oct. 1995; 179 Pgs.
Costello, A. M. et al.; Redesigning the BSD Callout and Timer Facilities; Nov. 2, 1995; 12 Pgs.
Foster, J.M.—Senior Research Fellow, Dept. of Engineering, Aberdeen University; List Processing; 1967; 54 Pgs.
Printout—Wavelan Pomcia driver, Jean II–HPLB '96; pp. 1–78.
Van Wyk, C. J.; Data Structures & C Programs; 1988; 30 Pgs.
Sessions, R., Reusable Data Structures For C; 1989; 33 Pgs.
Frakes, W. B., et al.; Information Retrieval Data Structures & Algorithms, Chapter 13; 1992; pp. 293–305.
Xu, J.; IEEE Transactions on Computers, vo. 51, No. 9; Cost–Effective Flow Table Designs for High–Speed Routers: Architecture and Performance Evaluation; Sep. 2002; pp. 1089–1099.
Keshav, S.; On the Efficient Implementation of Fair Queuing; Pgs. 1–20.
Kruse, R. L.; Data Structures and Program Design $2^{nd}$ Edition, Chapter 4; 1987, 1984; pp. 104–155.
Vanghese, G., et al.; Hashed and Hierarchical Timing and Wheels: Data Structures for the Efficient Implementation of a Time Facility; 1987; pp. 25–38.
Xu, J.; IEEE Transactions on Computers, vo. 51, No. 9; Cost–Effective Flow Table Designs for High–Speed Routers: Architecture and Performance Evaluation; Sep. 2002; pp. 1089–1099.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 5 and 6 is confirmed.

Claims 3 and 7 are determined to be patentable as amended.

Claims 4 and 8, dependent on an amended claim, are determined to be patentable.

New claims 9-12 are added and determined to be patentable.

3. A method for storing and retrieving information records using a linked list to store and provide access to the records, at least some of the records automatically expiring, the method comprising the steps of:
  accessing the linked list of records *to search for a target record*,
  identifying at least some of the automatically expired ones of the records *while searching for the target record*, and
  removing at least some of the automatically expired records from the linked list when the linked list is accessed.

7. A method for storing and retrieving information records using a hashing technique to provide access to the records and using an external chaining technique to store the records with same hash address, at least some of the records automatically expiring, the method comprising the steps of:
  accessing a linked list of records having same hash address *to search for a target record*,
  identifying at least some of the automatically expired ones of the records *while searching for the target record*,
  removing at least some of the automatically expired records from the linked list when the linked list is accessed, and
  inserting, retrieving or deleting one of the records from the system following the step of removing.

*9. The method of claim 3, further comprising:*
  *deallocating memory of the at least some of the automatically expired records.*

*10. The method of claim 9, further comprising:*
  *inserting the target record into the linked list if the target record was not found during the searching.*

*11. The method of claim 7, further comprising:*
  *deallocating memory of the at least some of the automatically expired records.*

*12. The method of claim 11, wherein the inserting, retrieving or deleting includes inserting the target record into the linked list if the target record was not found during the searching.*

\* \* \* \* \*

(12) EX PARTE REEXAMINATION CERTIFICATE (8564th)
United States Patent
Nemes

(10) Number: US 5,893,120 C2
(45) Certificate Issued: Sep. 20, 2011

(54) METHODS AND APPARATUS FOR INFORMATION STORAGE AND RETRIEVAL USING A HASHING TECHNIQUE WITH EXTERNAL CHAINING AND ON-THE-FLY REMOVAL OF EXPIRED DATA

(75) Inventor: Richard Michael Nemes, Brooklyn, NY (US)

(73) Assignee: Bedrock Computer Technologies, LLC, Tyler, TX (US)

Reexamination Request:
No. 90/011,426, Jan. 10, 2011

Reexamination Certificate for:
Patent No.: 5,893,120
Issued: Apr. 6, 1999
Appl. No.: 08/775,864
Filed: Jan. 2, 1997

Reexamination Certificate C1 5,893,120 issued Apr. 12, 2011

(51) Int. Cl.
*G06F 17/30* (2006.01)

(52) U.S. Cl. .............................. 707/999.001; 777/999.1; 777/999.101; 777/999.202; 777/999.206; 777/E17.036

(58) Field of Classification Search ........................ None
See application file for complete search history.

(56) References Cited

U.S. PATENT DOCUMENTS

| | | | |
|---|---|---|---|
| 4,695,949 A | 9/1987 | Thatte et al. |
| 5,121,495 A | 6/1992 | Nemes |
| 5,287,499 A | 2/1994 | Nemes |
| 5,724,538 A | 3/1998 | Morris et al. |
| 6,119,214 A | 9/2000 | Dirks |

OTHER PUBLICATIONS

Van Wyk et al., "The Complexitiy of Hashing with Lazy Deletion", Algorithmica 1:17–29 (1986).

*Primary Examiner* — Andrew L Nalven

(57) ABSTRACT

A method and apparatus for performing storage and retrieval in an information storage system is disclosed that uses the hashing technique with the external chaining method for collision resolution. In order to prevent performance deterioration due to the presence of automatically expiring data items, a garbage collection technique is used that removes all expired records stored in the system in the external chain targeted by a probe into the data storage system. More particularly, each insertion, retrieval, or deletion of a record is an occasion to search an entire linked-list chain of records for expired items and then remove them. Because an expired data item will not remain in the system long term if the system is frequently probed, it is useful for large information storage systems that are heavily used, require the fast access provided by hashing, and cannot be taken off-line for removal of expired data.

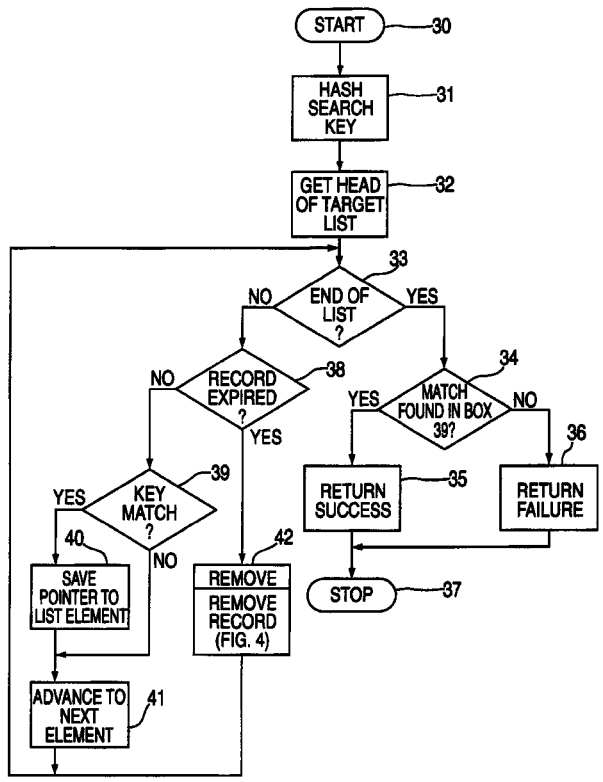

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

Claims 9-12 were not reexamined.

* * * * *